(12) United States Patent
Domine et al.

(10) Patent No.: US 7,544,420 B2
(45) Date of Patent: Jun. 9, 2009

(54) BACKING LAYERS AND SUBSTRATES FOR ARTICLES FORMED FROM IONOMER LAMINATES

(75) Inventors: Joseph Dominic Domine, Humble, TX (US); Jeffrey Valentage, Royal Oak, MI (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 727 days.

(21) Appl. No.: 10/825,824

(22) Filed: Apr. 16, 2004

(65) Prior Publication Data

US 2004/0241479 A1 Dec. 2, 2004

Related U.S. Application Data

(60) Provisional application No. 60/473,789, filed on May 27, 2003.

(51) Int. Cl.
 *B32B 29/00* (2006.01)
(52) U.S. Cl. .............. 428/413; 428/423.1; 428/474.4; 428/480; 428/521; 428/522
(58) Field of Classification Search ............... 428/413, 428/423.1, 474.4, 480, 521, 522
See application file for complete search history.

(56) References Cited

U.S. PATENT DOCUMENTS

| | | |
|---|---|---|
| 2,714,605 A | 8/1955 | Jones |
| 2,764,563 A | 9/1956 | McMaster et al. |
| 3,072,618 A | 1/1963 | Turbak |
| 3,094,144 A | 6/1963 | Oxley et al. |
| 3,097,194 A | 7/1963 | Leonard, Jr. et al. |
| 3,205,285 A | 9/1965 | Turbak et al. |
| 3,255,130 A | 6/1966 | Keim et al. |
| 3,264,272 A | 8/1966 | Rees .................... 260/78.5 |
| 3,322,734 A | 5/1967 | Rees et al. |
| 3,338,734 A | 8/1967 | Goff et al. |
| 3,355,319 A | 11/1967 | Rees |
| 3,522,222 A | 7/1970 | Taylor |
| 3,522,223 A | 7/1970 | Taylor |
| 4,148,972 A | 4/1979 | Yamane et al. .......... 428/515 |
| 4,307,211 A | 12/1981 | Ito et al. |
| 4,335,175 A | 6/1982 | Webb ................... 428/213 |
| 4,569,865 A | 2/1986 | Placek |
| 4,656,098 A | 4/1987 | Yonekura et al. ......... 428/517 |
| 4,800,130 A | 1/1989 | Yonekura et al. ......... 428/517 |
| 4,801,649 A | 1/1989 | Statz |
| 4,911,451 A | 3/1990 | Sullivan et al. |
| 5,089,332 A | 2/1992 | Feinberg |
| 5,120,484 A | 6/1992 | Cloeren |
| 5,206,294 A | 4/1993 | Dawson ................. 525/196 |
| 5,210,138 A | 5/1993 | Yamamoto et al. |
| 5,281,651 A | 1/1994 | Arjunan et al. |
| 5,320,905 A | 6/1994 | Vaughn et al. |
| 5,397,833 A | 3/1995 | Arjunan |
| 5,482,766 A | 1/1996 | Mathavan et al. ........ 428/308.4 |
| 5,516,474 A | 5/1996 | Cloeren |
| 5,543,233 A | 8/1996 | Latiolais et al. ........... 428/516 |
| 5,554,698 A | 9/1996 | Wang et al. |
| 5,631,328 A | 5/1997 | Wang et al. |
| 5,929,174 A | 7/1999 | Permentier et al. |
| 5,973,046 A | 10/1999 | Chen et al. |
| 6,413,644 B2 * | 7/2002 | Ashcraft .................. 428/441 |
| 6,682,825 B1 * | 1/2004 | Kennedy et al. ........... 428/517 |
| 2001/0003021 A1 | 6/2001 | Shepard et al. .......... 428/475.8 |
| 2002/0114951 A1 | 8/2002 | Horansky ................. 428/412 |
| 2002/0114965 A1 | 8/2002 | Horansky ................. 428/520 |
| 2004/0241474 A1 * | 12/2004 | Domine ................... 428/500 |

FOREIGN PATENT DOCUMENTS

| | | |
|---|---|---|
| DE | 36 26 809 | 12/1987 |
| EP | 0 287 839 | 10/1988 |
| EP | 0 342 897 | 11/1989 |
| EP | 0 721 856 | 7/1996 |
| EP | 1 279 493 | 1/2003 |
| GB | 1011981 | 1/1965 |
| JP | 08269409 | 10/1996 |
| JP | 2000085062 | 3/2000 |
| JP | 04052136 | 2/2004 |
| WO | WO 95/11929 | 5/1995 |
| WO | WO 96/23009 | 8/1996 |
| WO | WO 97/02317 | 1/1997 |
| WO | WO 97/11995 | 4/1997 |
| WO | WO 98/52981 | 11/1998 |
| WO | WO 01/78981 | 10/2001 |

(Continued)

OTHER PUBLICATIONS

Kroschwitz, J.; "Blowing Molding", Concise Encyclopedia of Polymer Science and Engineering, pp. 90-92, 1990.

(Continued)

*Primary Examiner*—Leszek Kiliman

(57) ABSTRACT

The present invention relates to new backing layers and/or new substrates for making (1) new multilayer structures formed from one or more ionomers and one or more tie-layers, and optionally a new backing layer to form laminates, (2) new composite articles made from these laminates in combination with optional new substrate materials, and (3) new methods of making composite articles from these laminates by shaping and subsequently contacting them with a substrate material.

52 Claims, No Drawings

FOREIGN PATENT DOCUMENTS

| | | | |
|---|---|---|---|
| WO | WO01/78981 | * | 10/2001 |
| WO | WO 02/066249 | | 8/2002 |
| WO | WO 02/067853 | | 9/2002 |
| WO | WO 02/078953 | | 10/2002 |
| WO | WO 02/078954 | | 10/2002 |

OTHER PUBLICATIONS

Lewis, Sr., Richard J., "*Hawley's Condensed Chemical Dictionary*," Van Nostrand Reinhold p. 852, 1997.

Wiley, John et al., "Thermoforming," Encyclopedia of Polymer Science and Engineering, vol. 16 pp. 807-.

Booth et al., "*Comprehensive Polymer Science*," Pergamon Press, vol. 2 pp. 755-772, 1989.

Abstract for DE 36 26 809, Dietmar, Dec. 10, 1987, entitled "Biaxially Oriented Polypropylene Film—Includes Gas Barrier and Sealing Layers, for Packaging Foodstuffs".

Abstract for EP 0 721 856, Olivier, Jul. 17, 1996, entitled "Sealing Profile and method for Making the Same".

* cited by examiner

BACKING LAYERS AND SUBSTRATES FOR ARTICLES FORMED FROM IONOMER LAMINATES

CROSS REFERENCE TO RELATED APPLICATIONS

This application claims the benefit of Provisional Application No. 60/473,789 filed May 27, 2003, the disclosure of which is incorporated by reference.

FIELD OF THE INVENTION

The present invention relates to new backing layers and/or new substrates for making (1) new multilayer structures formed from one or more ionomers and one or more tie-layers, and optionally a new backing layer to form laminates, (2) new composite articles made from these laminates in combination with optional new substrate materials, and (3) new methods of making composite articles from these laminates by shaping and subsequently contacting them with a substrate material.

BACKGROUND OF THE INVENTION

Durable, glossy fascia associated with articles such as automobiles, luggage, appliances, and other durable articles made from plastics increase both the aesthetic appeal and the utility of these articles. These article attributes are provided, in part, through the incorporation of ionomer materials.

Ionomer materials are known in the art, and are useful in laminates to coat various substrates to form composite articles. See, for example, U.S. Pat. Nos. 5,482,766, 4,148,972, 5,543,233, 4,800,130, 4,656,098, 5,206,294, 4,335,175, DE 36 26 809 A, EP 0 721 856, JP 08269409, JP 2000085062, JP 04052136, WO 02/078953 and WO 02/078954. Ionomer laminates are useful for their scratch and abrasion resistance, as well as toughness and aesthetic appeal. However, with a growing demand for new applications for ionomer laminates and composite articles produced from ionomer laminates, there continues to be a need for new materials to produce new laminates for the wide array of applications.

The invention fulfills this need by providing for backing layer and substrate materials that may be used in new ionomer laminates and new composite articles produced from those ionomer laminates

SUMMARY OF THE INVENTION

In an embodiment, the invention relates to a composite comprising an ionomer layer, a tie-layer; and a substrate.

In an embodiment, the invention relates to a composite comprising an ionomer layer, a tie-layer; and a substrate wherein the tie-layer is disposed between the ionomer layer and the substrate.

In yet another embodiment, the invention relates to a composite article comprising:
a) an ionomer layer;
b) a tie-layer;
c) a backing layer; and
d) a substrate;
wherein the tie-layer and backing layer are disposed between the ionomer layer and the substrate.

Additionally, the invention also provides for a method of forming a composite article comprising:
(a) forming a laminate;
(b) forming the laminate into a shape, the laminate comprising an ionomer layer contacted to a tie-layer; and
(c) securing a substrate to the tie-layer of the laminate to form the composite article.

In another embodiment, the invention provides for a method of forming a composite article comprising:
(a) coextruding at least two materials to form a laminate;
(b) thermoforming the laminate into a shape, the laminate comprising an ionomer layer contacted to a tie-layer; and
(c) injection molding a substrate layer to the tie-layer of the laminate to form the composite article.

The invention also provides for a composite article formed by the method comprising:
(a) forming a laminate comprising an ionomer layer and a tie-layer;
(b) coextruding the ionomer layer and the tie-layer with a backing layer;
(c) forming a shape from the laminate, resulting in a shaped laminate; and
(d) securing a substrate material to the shaped laminate such that the substrate material is secured to the backing layer.

In any of the previous embodiments, the backing layer and/or substrate, alone or in combination with (blended or layered), may be selected from the group consisting of acrylonitrile-ethylene-styrene; acrylonitrile-styrene-acrylate; an amorphous polyamide; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purposes rubber; nitrile rubber; polyacrylonitrile; a polyamide compound that is impact modified with an acid and/or an anhydride containing polymer or rubber; a polyamide elastomer; a polyarylate; polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate acrylonitrile butadiene styrene; polyphenylsulfone; polymethylmethacrylate; a polystyrene; a high impact polystyrene; a syndiotactic polystyrene; polystyrene maleic anhydride; polyethylene-vinyl alcohol; a sheet molding compound or a crosslinked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; and mixtures thereof.

In any of the previous embodiments, the ionomer layer may include a first ionomer layer and a second ionomer layer.

In the previous embodiments, the first ionomer layer or the second ionomer layer may be pigmented, natural, or clear.

DETAILED DESCRIPTION OF THE INVENTION

As used herein, the term "layer" refers to each of the one or more materials, the same or different, in an essentially planar form, that are secured to one another by any appropriate means such as by an inherent tendency of the materials to adhere to one another, or by inducing the materials to adhere as by a heating, radiative, chemical, or some other appropriate process to form laminates.

As used herein, the term "laminate" refers to any number of the same or different materials in layer form, each layer being secured to one another by any appropriate means such as by an inherent tendency of the materials to adhere to one another, or by inducing the materials to adhere as by a heating, radiative, chemical, or some other appropriate process. Some non-limiting process examples of forming laminates are (co)extrusion, thermal lamination, or adhesive bonding, or some combination thereof. The laminate may include an optional backing layer.

As used herein, the term "tie-layer" refers to a layer bonded to the ionomer layer(s). In most embodiments that include a backing layer, the backing layer is bonded to the ionomer layer(s) with the tie-layer. In embodiments that include a substrate, the substrate is bonded to the ionomer layer(s) with the tie-layer. Each tie-layer may comprise multiple layers.

As used herein, "backing layer" refers to a tie-layer that forms the surface opposite from the ionomer surface of the multilayered laminate. In most embodiments, the backing layer requires a tie-layer of a different composition to bond it to the ionomer layer(s).

As used herein, "composite article" refers to an article formed from a multilayer laminate secured to a substrate.

As used herein, "substrate" refers to that part of the composite article that is behind the multilayered laminate, and typically provides the largest proportion of the mass of the composite article. It therefore governs the range of many of the physical properties of the composite article such as stiffness, tensile strength, impact strength, etc. Surface properties of the composite article, such as gloss, scratch resistance, abrasion resistance, color, appearance, "flop", are usually unaffected by the substrate.

As is well known in the art, the demarcation between "film" and "sheet" is nominally 250 μm. However, as used herein the term "sheet" can refer to single layered or multilayered structures with thicknesses that are greater than, equal to or less than 250 μm.

As used herein, the term "Groups" or "Group" refers to the new numbering scheme for the Periodic Table Groups as in HAWLEY'S CONDENSED CHEMICAL DICTIONARY 852 (13th ed. 1997).

In an embodiment, the composite article provides for a multilayered sheet secured to a substrate. The multilayered sheet provides for an ionomer layer (surface layer), pigmented or natural color, and a tie-layer, pigmented or natural color. The multilayered sheet is secured to a substrate.

In another embodiment, the composite article provides for a multilayered sheet including a backing layer. The multilayered sheet provides for an ionomer layer (surface layer), pigmented or natural color, a tie-layer, pigmented or natural color, and a backing layer.

In another embodiment, the composite article provides for a multilayered sheet secured to a substrate. The multilayered sheet provides for a set of ionomer layers comprising a surface layer of clear ionomer and a sub-surface layer of pigmented or clear ionomer, and a pigmented or natural color tie-layer. The multilayered sheet is secured to a substrate.

The composite article also provides for a multilayered sheet, including a backing layer, secured to a substrate. The multilayered sheet provides for a set of ionomer layers comprising a surface layer of clear ionomer and a sub-surface layer of pigmented or clear ionomer, a pigmented or natural color tie-layer, and a pigmented or natural color backing layer.

In yet another embodiment, the composite article provides for a multilayered sheet including a backing layer secured to a substrate. The multilayered sheet provides for an ionomer layer (surface layer), pigmented or natural color, a tie-layer, pigmented or natural color, and a pigmented or natural color backing layer. The multilayered sheet is secured to a substrate.

In an embodiment, the composite article provides for a multilayered sheet including a backing layer secured to a substrate. The multilayered sheet provides for a set of ionomer layers comprising a surface layer of clear ionomer and a sub-surface layer of pigmented or clear ionomer, a pigmented or natural color tie-layer, and a pigmented or natural color backing layer. The multilayered sheet is secured to a substrate.

In another embodiment, the composite article provides for a multilayered sheet secured to a substrate. The multilayered sheet provides for a set of ionomer layers comprising a surface layer of clear ionomer and a sub-surface layer of pigmented or clear ionomer, and a pigmented or natural color tie-layer. The multilayered sheet is secured to a substrate.

Ionomer

Ionomers useful in the present invention are ionic compounds which are copolymers of $C_2$ to $C_4$ α-olefin derived units (ethylene is herein included as an "α-olefin"), and $C_3$ to $C_6$ α,β-ethylenically unsaturated carboxylic acids, and which contain one or more kinds of metallic or organic cations associated with at least 5% of the acidic pendant groups of the polymer. Typical ionomers and methods of production are disclosed in, for example, U.S. Pat. Nos. 3,264,272, 4,911,451, 5,210,138, and 5,929,174; and WO 98/52981, 95/11929, 96/23009, 97/11995, and 97/02317, and described in COMPREHENSIVE POLYMER SCIENCE 755-772 (Colin Booth & Colin Price, ed. Pergamon Press 1989), in particular relating to ethylene-based materials.

The metal ion or ions suitable for forming the ionic copolymers of the present invention comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$ $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization".

The ionomers useful in the present invention, either alone or as a blend of two or more ionomers, generally include more than 60 wt % α-olefin derived units in one embodiment by weight of the ionomer, and more than 70 wt % α-olefin derived units in another embodiment, and more than 80 wt % α-olefin derived units in one embodiment, and more than 85 wt % α-olefin derived units in yet another embodiment, and less than 95 wt % α-olefin derived units in another embodiment, and less than 85 wt % α-olefin derived units in another embodiment, and less than 75 wt % α-olefin derived units in yet another embodiment, and from 60 to 95 wt % α-olefin derived units in another embodiment, wherein a desirable range of α-olefin derived units that make up the ionomer is any combination of any upper limit with any lower limit described herein; and from 5 to 25 wt % of α,β-ethylenically unsaturated carboxylic acid derived units in one embodiment, and from 1 to 15 wt % of α,β-ethylenically unsaturated carboxylic acid derived units in another embodiment, and from 8 to 20 wt % of α,β-ethylenically unsaturated carboxylic acid derived units in another embodiment, wherein a desirable embodiment of a useful ionomer may comprise any upper wt % limit and any lower wt % limit of any α,β-ethylenically unsaturated carboxylic acid derived units described herein.

The polymer may be neutralized to form the ionomer to any degree between 10% to 100% based on the total amount of neutralizable carboxylate groups in one embodiment, and from 20% to 80% in another embodiment, and from 40% to 75% in yet another embodiment, and from 5% to 70% in yet another embodiment, provided the necessary scratch and mar resistance is maintained. A desirable level of neutralization may include any upper neutralization % limit and any lower neutralization % limit described herein.

One embodiment of an ionomer can be described as in the following structure (1):

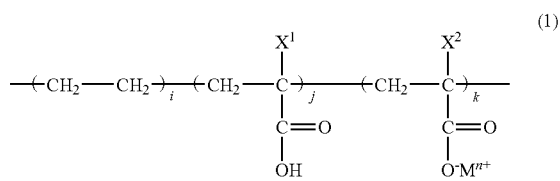

wherein $X^1$ and $X^2$ can be the same or different and are hydrogen or a $C_1$ to $C_6$ alkyl, and $M^{n+}$ is a metal ion or $NH_4^+$. Of course, it is understood that when n is >1, such as with a divalent metal ion such as $Zn^{2+}$, that charge neutrality for the ionomer is achieved by reaction with a total of n acid groups from either the same polymer chain, or an adjacent polymer chain. The structure (1) is not intended to be construed that the ionomer is a block copolymer or limited to being a block copolymer. The values of i, j, and k are determined by the following relationships (2) and (3):

$$\frac{j+k}{i+j+k} = Q \quad (2)$$

$$\frac{k}{j+k} = P \quad (3)$$

wherein Q is from 10 to 40% of the polymer units derived from the acidic monomer(s) relative to the total weight of the ionomer in one embodiment, and from 15 to 20% of polymer units derived from the acidic monomer(s) in another embodiment, and P is from 10 to 80% of the acidic groups neutralized with the metallic ions in one embodiment, and from 20 to 70% of the acidic groups neutralized with the metallic ions in another embodiment, and from 20 to 60% in yet another embodiment, and further ranges as stated above. The polymer component i, derived from ethylene in one embodiment, can be linear or branched.

The ionomers or blends of two or more ionomers should be capable of being formed into a sheet having a thickness of from 15 μm to 6 mm, and from 25 μm to 700 μm in another embodiment, and possess desired properties, i.e., a high or low gloss, scratch resistance, abrasion resistance, etc. Useful ionomers or ionomer blends have a peak melt temperature of greater than 75° C. in one embodiment, and between 75° C. and 100° C. in another embodiment, and between 75° C. and 95° C. in one embodiment, and between 80° C. and 90° C. in another embodiment; and a melt index (MI) of between 0.1 dg/min and 30 dg/min (ASTM D1238, 190/2.16) in one embodiment, from 0.2 to 8 dg/min in one embodiment, from 0.5 to 5 dg/min in another embodiment, and from 0.8 to 2.5 dg/min in yet another embodiment, wherein a desirable range may be any combination of any upper MI limit with any lower MI limit described herein.

The ionomers useful in the present invention should provide high scratch and impact resistance to the laminate and composite article. The ionomers or ionomer blends have a 1% secant flexural modulus (ASTM D-790) of greater than 50 MPa in one embodiment, and greater than 100 MPa in another embodiment, and greater than 200 MPa in another embodiment, and greater than 400 MPa in yet another embodiment, between 50 and 400 MPa in one embodiment, and from 100 to 350 MPa in another embodiment. Desirable ionomers are ethylene methacrylic acid copolymer ionomers and ethylene acrylic acid copolymers ionomers and the like. Particularly desirable ionomers are those that are sodium or zinc salts of acrylic acid or methacrylic acid copolymers.

Further, in a desirable embodiment, certain blends of ionomers based on ethylene acrylic acid copolymer neutralized with divalent and monovalent metal ions (cations) such as $Zn^{2+}$ and $Na^+$, display a synergistic MI "uplift" as disclosed in, for example, U.S. Pat. Nos. 5,210,138, and 5,929,174 are useful. In one embodiment of the invention, one or more of the ionomer layers that make up the laminate is a blend of a first ionomer having an MI value of from 0.6 to 1.0 dg/min, and a second ionomer having an MI value of from 2.1 to 3.0 dg/min. The blend of the first and second ionomers includes from 45 wt % to 95 wt % of the first ionomer in one embodiment, and from 55 wt % to 85 wt % of the first ionomer in another embodiment, and from 65 wt % to 80 wt % of the first ionomer in yet another embodiment, and from 72 wt % to 78 wt % of the first ionomer in yet another embodiment, and 75 wt % of the first ionomer in yet another embodiment, wherein a desirable range may include any upper wt % limit and any lower wt % limit described herein. The blends may include blends of two or more ionomers having different metallation (different metals and/or different % of metallation), different MI values, or a combination of variables.

Other examples of ionomers useful in the present invention include, but are not limited to, butadiene-acrylic acid copolymer ionomers, perfluorsulfonate ionomers, perfluorocarboxylate ionomers, telechelic polybutadiene ionomers, sulfonated ethylene-propylene-diene terpolymer ionomers, styrene-acrylic acid copolymer ionomers, sulfonated polystyrene ionomers, sulfonated polypentenamer ionomers, telechelic polyisobutylene sulfonated ionomers, alkyl methacrylate-sulfonate copolymer ionomers, styrene-based polyampholytes ionomers and acid-amine ionomers and the like. Typical examples of ionomers employing salts of carboxylic acid type pendent groups are disclosed in GB 1,011, 981; U.S. Pat. Nos. 3,264,272; 3,322,734; 3,338,734; 3,355, 319; 3,522,222; and 3,522,223. Typical examples of ionomers employing phosphonate-type pendent groups include those disclosed in U.S. Pat. Nos. 3,094,144; 2,764, 563, 3,097,194; and 3,255,130. Typical examples of ionomers employing sulfonate-type pendent groups include those disclosed in U.S. Pat. Nos. 2,714,605; 3,072,618; and 3,205, 285. Other useful ionomers are disclosed generally in U.S. Pat. Nos. 5,631,328, 5,631,328, 5,554,698, 4,801,649, 5,320, 905, 5,973,046, and 4,569,865.

Ionomers comprising copolymers of ethylene derived units and acrylic acid (AA) derived units are desirable. Examples of commercially available ionomers include, but are not limited to, IOTEK ionomers (ExxonMobil Chemical Company, Houston, Tex.), such as IOTEK 8000, a 45% sodium neutralized ethylene-based ionomer of 15 wt % acrylic acid (prior to neutralization), and IOTEK 7030, a 25% zinc neutralized ethylene-based ionomer of 15 wt % acrylic acid, and SURLYN ionomers (DuPont Company, Wilmington, Del.).

The one or more ionomer layers may contain additives such as antioxidants, pigments or dyes, and other agents. In one embodiment, at least one layer of ionomer in the final composite article will have a pigment, antioxidant, or other additives. For external uses, it is desirable to add a UV stabilizer such as TINUVEN 791 (CIBA Specialty Chemicals) or UVASIL 2000 HM or LM (Great Lakes Chemicals), both silicon based compositions. Also, for scratch resistance, it is advantageous to add siloxane based compositions such as MB50-001 and/or MB50-321 (Dow Corning Corporation). Effective levels are known in the art and depend on the details of the base polymers, the fabrication mode and the requirements of the end application. In addition, hydrogenated and/or petroleum hydrocarbon resins and other plasticizers may be used as modifiers.

Other examples of additives include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts. In one embodiment, a metallic or metal flake pigment such as is used in the automotive industry may be used. The pigment may be included in a first, second, third ionomer layer, or any other layer. For example, the pigment may desirably be in a second layer only, the first layer having no pigment and providing gloss and scratch resistance to the laminate. This second layer may have metallic pigment or metal flake blend and be processed in a manner such that the final product has a shiny, metallic look, and changes appearance dependent upon the angle of view ("flop") useful in, for example, exterior automotive components, or a dull look useful in, for example, interior automotive components.

Tie-Layer

In one embodiment of the invention, the tie-layer material is an acid polymer, and can comprise one layer or more of identical or different acid polymers (see, e.g., WO 02/0789953 and WO 02/078954). In another embodiment, the at least one tie-layer can be a blend of an acid polymer and another polymer such as an α-olefinic polymer. Desirably, at least the backing layer is a blend of an acid polymer and the material to be used as the substrate material in the finished composite article. The tie-layer, comprising at least one layer of material, is secured to at least the ionomer layer or layers in one embodiment, and the substrate layer in a further embodiment. The tie-layer may have a thickness in the range of from 2.5 μm to 6 mm in one embodiment, and from 25 μm to 650 μm in another embodiment, from 2.5 μm to 400 μm in yet another embodiment, from 2 μm to 100 μm in yet another embodiment, and from 10 μm to 1 mm in yet another embodiment.

Acid polymers represent a broad class of compounds typically formed by the copolymerization of unsaturated carboxylic acid and at least one α-olefin. Desirably, the carboxylic acid may be formed from a carboxylic acid alone or in combination with an ester. More particularly, the acid polymer may be an acid terpolymer represented by the following structure (4):

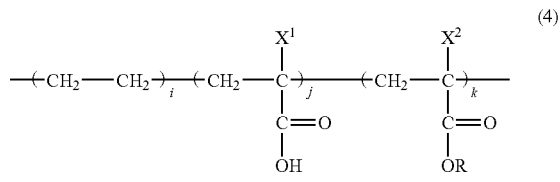

wherein $X^1$ and $X^2$ can be the same or different and are hydrogen or a $C_1$ to $C_6$ alkyl, R can be a $C_1$ to $C_{10}$ normal alkyl or branched alkyl in one embodiment, and a $C_1$ to $C_4$ normal alkyl or branched alkyl in another embodiment, j has a value of from 5 to 15% relative to the acid terpolymer weight, and k has a value of from 5 to 25%, and i has a value of from 65 to 90%. In one embodiment, the acid polymer may be partially neutralized, creating a so called "soft ionomer", or partially neutralized acid polymer, wherein the degree of neutralization is from 10% to 75%. The neutralized carboxylic acid groups can be characterized as above for the ionomer. So called soft ionomers are disclosed in, for example, WO 97/02317.

The acid polymers useful as tie-layer materials have a melt index (MI) of from 0.1 to 40 dg/min in one embodiment, from 1 to 30 dg/min in another embodiment, from 2 to 20 dg/min in yet another embodiment, and from 2.5 to 10 dg/min in yet another embodiment (ASTM D1238, 190/2.16), a desirable range including a combination of any upper MI limit and any lower MI limit disclosed herein.

In one embodiment of the invention, the acid polymers are acid terpolymers, which comprise terpolymers of ethylene derived units, alkyl (meth)acrylate derived units, particularly methyl (meth)acrylate derived units, and (meth)acrylic acid derived units, such as disclosed in U.S. Pat. Nos. 5,397,833, and 5,281,651, and herein referred to as "EAAT". Other useful acid polymers are disclosed in U.S. Pat. Nos. 4,307,211, and 5,089,332. In one embodiment, the acid polymer useful in the tie-layer of the laminate is a terpolymer of ethylene derived units, alkyl (meth)acrylate derived units, and (meth)acrylic acid derived units, wherein the alkyl (meth)acrylate derived unit is selected from methyl (meth)acrylate, ethyl (meth)acrylate, propyl (meth)acrylate, butyl (meth)acrylate and combinations thereof.

In one embodiment of the acid polymer used in the present invention is an ethylene/methyl acrylate/acrylic acid (E/MA/AA) terpolymer comprising an acrylate content of from 4 to 40 wt % based on the weight of the entire polymer, from 5 to 35 wt % in another embodiment. The acrylic acid derived unit content is from 1 to 10 wt % in one embodiment, and from 2 to 8 wt % in another embodiment. Described another way, a desirable acid terpolymer is a terpolymer of acrylic acid derived units from 5 wt % to 15 wt % of the polymer, and methyl acrylate derived units from 5 wt % to 25 wt % of the polymer. The remainder of the terpolymer is made up of ethylene derived units.

The E/MA/AA terpolymer may comprise a wide range of melt indexes (MI), generally between 0.1 to 100 dg/min in one embodiment, from 0.1 to 30 dg/min in one embodiment, and from 1 to 10 dg/min in another embodiment, and from 0.5 to 5 dg/min in yet another embodiment (ASTM D1238, 190/2.16), a desirable MI embodiment of the terpolymer comprising any upper MI limit with any lower MI limit described herein.

Commercial examples of acid polymers useful in the tie-layer of the invention include, but are not limited to, ESCOR AT-310 resin having 6.5 wt % methyl acrylate derived units and 6.5 wt % acrylic acid derived units, and ESCOR AT-320 having 18 wt % methyl acrylate derived units and 6 wt % acrylic acid derived units, both are ethylene acid terpolymers (ExxonMobil Chemical Company, Houston, Tex.). Soft ionomers are commercially available as IOTEK 7510, a 69% zinc neutralized acid terpolymer of 6 wt % acrylic acid and 20 wt % methyl acrylate (prior to neutralization), and IOTEK 7520, a 43% neutralized acid terpolymer of 6 wt % acrylic acid and 20 wt % methyl acrylate, also available from ExxonMobil Chemical Company.

The material that makes up the at least one tie-layer, or alternately, the backing layer, may be selected from acid polymers, soft ionomers, and thermoplastics such as, for example, polypropylene homopolymers and copolymers, polyethylene homopolymers and copolymers, impact copolymers (ICP), polycarbonates, polyamides, and blends thereof. Acid polymers, or blends of the acid polymer with a thermoplastic, are desirable tie-layer materials. In one embodiment, one layer of the tie-layer is made from an acid polymer and a high density polyethylene polymer blend. In another embodiment, the tie-layer is a acid polymer and a polypropylene blend. In yet another embodiment, one layer of the tie-layer is a blend of an acid polymer and an impact copolymer.

In a desirable embodiment, the tie-layer is made up of at least a first layer and a backing layer, and any number of intervening layers, the first layer being secured to the ionomer layer, and the backing layer being securable to a substrate, wherein the backing layer is a blend of an acid polymer, desirably and acid terpolymer, and the material to be used as the substrate in the composite article. The blend may include from 10 wt % to 90 wt % of the acid terpolymer by weight of the backing layer blend in one embodiment, and from 20 wt % to 80 wt % in another embodiment, and from 25 wt % to 65 wt % in yet another embodiment, and from 40 wt % to 60 wt % in yet another embodiment, a desirable embodiment of the backing layer including any combination of any upper acid terpolymer wt % limit and any lower acid terpolymer wt % limit described herein.

The tie-layer may also include additives as described above for the ionomer layers, such as pigments, dyes, antioxidants, antiozonants, and other agents to improve its performance. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts.

Backing Layer

As stated above, a "backing layer" refers to a tie layer, on the opposite side of the surface ionomer layer of the multi-layered laminate. In an embodiment that includes a substrate, the backing layer secures the multilayer laminate to the substrate. In another embodiment, the backing layer material comprises a blend of tie-layer material(s), as described above, with substrate material(s) described below and/or substrate material(s) disclosed in WO 02/078953 A. However, in yet another embodiment, the backing layer comprises at least one substrate material described below.

When the backing layer comprises a blend, the blend may include from 10 wt % to 90 wt % of tie-layer material(s) by weight of the backing layer blend in one embodiment, and from 20 wt % to 80 wt % in another embodiment, and from 25 wt % to 65 wt % in yet another embodiment, and from 40 wt % to 60 wt % in yet another embodiment, a desirable embodiment of the backing layer including any combination of any upper limit and any lower limit of tie-layer materials described herein.

Substrate

A substrate material is a material, as described below, securable by any means known in the art, to the laminate. The substrate is contacted with and secured to the tie-layer to form a composite article. Substrate materials may be selected from the group consisting of acrylonitrile-ethylene-styrene (AES); acrylonitrile-styrene-acrylate (ASA); amorphous polyamides (made from mixed diacids, mixed diamines, or both); isobutylene-based elastomers including butyl rubbers based on isobutylene with isoprene and other monomers, and copolymers of isobutylene with alkylstyrene and other monomers, including the halogenated versions of the aforementioned elastomers; chlorosulfonated polyethylene rubbers (Hypalon™ from DuPont, Wilmington, Del.); copolyester (PETG: cyclohexane dimethanol copolyester, and other chemistries); cyclic olefin copolymer (COC); dynamically vulcanized alloys (Santoprene™ and Geoplast™ from Advanced Elastomer Systems, Akron, Ohio, Keltalloy™ from Alliance Alloys, Leominster, Mass., NexPrene™ from Harvest Polymers, Farnham, United Kingdom and similar products); liquid crystal polymers (LCP); natural rubber; general purposes rubbers; nitrile rubber; polyacrylonitrile (PAN); polyamides compounds that are impact modified with acid and/or anhydride containing polymers or rubbers; polyamide elastomers (Pebax™ from Atofina, Philadelphia, Pa., Vestamid™ from Degussa, Parsippany, N.J.); polyarylate (amorphous, aromatic polyester); polyaryletherketone (PAEK); polybenzimidazole; polybutylene terephthalate (PBT); polybutylene naphthalate (PBN); polyester elastomers (such as Hytrel™ from DuPont, Riteflex™ from Ticona, Summit, N.J., Keyflex® BT from Harvest Polymers, Farnham, United Kingdom and similar products); polyethylene naphthalate (PEN); polyetherketone (PEK); polyethersulfone (PES); polyimidesulfone (PIS); polymethacrylate acrylonitrile butadiene styrene (MABS); polyphenylsulfone; polymethylmethacrylate (PMMA); polystyrene; high impact polystyrene (HIPS); syndiotactic polystyrene; polystyrene maleic anhydride (SMA); polyethylene-vinyl alcohol (EVOH); sheet molding compounding (SMC) or a crosslinked, glass-reinforced, polyester/polystyrene composition; bulk molding compound (BMC); crosslinked polyurethane (RIM); reinforced polyurethane (RRIM), crosslinked dicyclopentadiene (Metton(R) RIM, Metton America, Inc, LaPorte, Tex.; silicone rubber; styrene block copolymers (SIS, SEBS); compression-molded articles of woven, glass-fiber-reinforced polypropylene fibers; and mixtures thereof.

The substrate materials described above may be used in foam form in some embodiments of the invention.

In one embodiment, the substrate materials may comprise mixtures of the substrate materials described above and/or mixtures with substrate materials disclosed in WO 02/067853 A1.

The substrate materials may also be combined with reinforcing and/or non-reinforcing materials such as glass fibers, carbon fibers, carbon black, polyaramide fibers, polyester fibers, mineral fibers, mica, talc, silica, metal whiskers, nanoclay, and the like. In a preferred embodiment, the fillers may be combined, for example in a blend, with a substrate material by any suitable means known in the art to produce a filled blend.

Embodiments of the substrate material of the invention may contain additives. Additives may be included in the substrate formulations or any other ionomer layer or tie-layer disclosed herein, as suggested by the intended uses of the materials and the knowledge and experience of the formulator. In one embodiment, included in any layer is a primary antioxidant to deter oxidative degradation of the polymer and/or an acid scavenger to neutralized acid catalyst residues which may be present in the polymer to a greater or lesser extent. Examples of the former class of additives would be hindered phenolic antioxidants and hindered amine light stabilizers, examples and the application of which are well documented in the art. Examples of the latter category of additives would be metal salts of weak fatty acids such as sodium, calcium, or zinc stearate and weakly basic, naturally occurring minerals such as hydrotalcite or a synthetic equivalent like DHT-4A ($Mg_{4.5}Al_2(OH)_{13}CO_{3-3.5}H_2O$, Kyowa Chemical Industry Co., Ltd., Kagawa, Japan).

Many other types of additives could be optionally included in the layer formulations of this invention such as flame retardants, lubricants, antistatic agents, slip agents, antiblocking agents, colorants, metal deactivators, mold release agents, fillers and reinforcements, fluorescent whitening agents, biostabilizers, and others.

Laminate Formation

The laminate may be formed by techniques well known and practiced in the art. Illustrative examples of laminate formation processes include coextrusion, thermal lamination, adhesive lamination, and extrusion lamination.

In one embodiment, the ionomer layer is adhered to the tie-layer in a coextrusion process. The coextrusion process can include 2, 3, 4 or more coextruded layers. In general, the process includes first melting each material in an appropriate device and extruding these molten or semi-molten materials together through a die or dies. Materials as described above are commercially available from one or more suppliers. For more processing information, one skilled in the art will know to consult the supplier or resources available from a technical library. The various layers can be combined in the melt stage via appropriate mechanisms known in the art prior to exiting the die, or combined after exiting the die. This is followed by contacting the thus formed multi-layered laminate with a series of chill rolls and sheet conveyer. The cooled laminate is then cut to size or rolled by appropriate means. Alternatively, one skilled in the art will appreciate that the various materials can be extruded or calendered singly and combined into a multilayer structure in a separate process.

The ionomer, tie-layer and other materials that form the laminate of the present invention can be (co)extruded using conventional equipment well known in the industry. In one embodiment, the extrusion process conditions are as follows. The temperature controllers of the extruder(s) used to process the ionomer(s) are set at 180° C. to 250° C. in one embodiment, yielding a final material melt temperature of 200° C. to 225° C. or higher. Desirably, the ionomer material melt temperature is greater than 200° C. in another embodiment. The temperature controllers of the extruder(s) used to process the tie-layer(s) are set for 195° C. to 225° C. in another embodiment, yielding a final material melt temperature of 210° C. to 230° C. The viscosity of each material being extruded should be closely matched to each other, at their respective processing temperatures, to achieve the targeted gloss level and color compatibility.

In one embodiment, extruders are used with a die that provides thermal isolation and/or control of each of the materials being processed to form the multilayer laminate. The temperature control can be achieved by any suitable means such as insulation and/or cooling and/or heating elements that can be controlled by electricity, steam, oil, or other gases or liquids. Such a coextrusion apparatus is described in, for example, U.S. Pat. Nos. 5,516,474 and 5,120,484, and references cited therein. The extruder/die may have separate extrusion layers within the die, and having a means by which to heat the material to a temperature higher than the melt temperature going into the die. For example, the die may be controlled at a temperature from about 150° C. to 250° C., while one or more of the material streams that will make up the laminate may be further heated to from 230° C. to 300° C. Heating the layer having the pigment in this manner is particularly desirable. This procedure improves the "flop" of the laminate, in particular when metallic pigments are used such as, for example, in an exterior automotive part.

Further, the cooling of the laminate takes place on a chill roll or rolls, and may be cooled any number of ways. In one embodiment, the cooling takes place at a chill roll temperature of from 25° C. to 90° C. In yet another embodiment, the chill rolls are at from 4° C. to 20° C. yielding a dull finish in the composite article when using a metallic pigment.

The final laminate may have any number of layers of ionomer and/or tie-layer materials. Embodiments of the laminate include one ionomer layer and one tie-layer. Another embodiment includes two layers of ionomer and a tie-layer. In yet another embodiment, the laminate includes two layers of ionomer and two tie-layers. In yet another embodiment of the laminate, there may be two layers of ionomer and a blend of tie-layer and substrate materials.

The final laminate may have any number of layers of ionomer and tie-layer materials. In one embodiment, the laminate is two layers, three in another embodiment, and four layers in yet another embodiment. In one embodiment, the ionomer layer or layers, prior to thermoforming, are from 13 µm to 1 mm. In another embodiment, the pre-thermoformed ionomer layer or layers is from 25 µm to 380 µm. In yet another embodiment, the pre-thermoformed ionomer layer is from 200 µm to 380 µm. The tie-layer can be of comparable thickness ranges, making the overall thickness of the laminate from 100 µm to 5 mm in one embodiment, or from 250 µm to 3 mm in yet another embodiment.

One skilled in the art will recognize that the viscosity of each material to be extruded should be closely matched to each other, at their respective processing temperatures, to achieve the targeted gloss level and color compatibility. For example, in certain embodiments, the melt viscosity, or melt indexes (MI, ASTM D1238 test method, at 190° C. and 2.16 kg load) of each adjoining layer are within less than 5 dg/min of each other in one embodiment, within less than 4 dg/min of each other in another embodiment, and less than 3 dg/min from one another in yet another embodiment, and from within 1 to 4 dg/min of the layer in which it is in direct contact with during coextrusion in another embodiment, and within 2 to 3 dg/min of one another in another embodiment.

Laminate Shaping Process

A shaped laminate may be produced by any suitable means known in the art. Thermoforming, vacuum forming, and blow molding are desirable embodiments.

Thermoforming is a process of forming at least one pliable plastic sheet into a desired shape. Methods of thermoforming are well known in the art. For example, see McDonald, Joseph N., *Thermoforming*, ENCYCLOPEDIA OF POLYMER SCIENCE AND ENGINEERING, VOL. 16, John Wiley & Sons, 807-832 (New York 1989). In an embodiment of the present invention, the laminate that is formed from the at least one ionomer layer and tie-layer are thermoformed into a desirable shape, typically resembling the end use article. For illustration, an embodiment of the thermoforming sequence is described. First, a piece of the laminate, cut to the appropriate size, is placed on a shuttle rack to hold it during heating. The shuttle rack indexes into the oven which pre-heats the film before forming. Once the piece of the laminate is heated, the shuttle rack indexes back to the forming tool. The piece of the laminate is then vacuumed onto the forming tool to hold it in place and the forming tool is closed. The forming tool can be either a "male" or "female" type tool. The tool stays closed to cool the shaped laminate and the tool is then opened. The shaped laminate is then removed from the tool.

In certain embodiments, blow molding is a suitable laminate forming means, which includes injection blow molding, extrusion blow molding, and stretch blow molding. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990). One skilled in the art will know the appropriate processing conditions to use for blow molding. See, for example, WO 02/078953.

Composite Article Formation

Formation of the composite article may be achieved by any suitable means known to those skilled in the art. Illustrative examples include blow molding, adhesive bonding, transfer molding, cast molding, cold forming, matched-die molding, injection molding, spray techniques, or combinations thereof. See, for example, WO 02/078953 A and WO 02/078954 A.

In one embodiment, these materials are coextruded in a multilayer die, then passed over at least two chill rolls and a sheet conveyor. This cooled sheet is then cut to size and/or rolled. Sheets taken from this cooled material can then be placed on a thermoforming rack and thermoformed to conform substantially to the shape of an injection molding tool, followed by cooling of the shaped laminate, and trimming of the cooled shaped laminate to prepare it for use in forming the shaped composite article. This trimmed, shaped laminate is then placed into the injection molding tool exposing at least one layer of the tie-layer, in particular, the backing layer, in order to allow the tie-layer to be secured to the substrate material to be injected. Hence, the substrate material in molten form is then injected into the tool, forming a cohesive unit with the shaped laminate. The part that results is a composite article having the desired shape and geometry of the end use article.

In an embodiment of the injection molding process, wherein a substrate material is injection molded into a tool into which the shaped laminate has been placed, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt the tie-layer material or backing layer to achieve adhesion between the layers. Some substrate materials may require substantially different processing temperatures well known in the art.

It will be understood by those skilled in the art that the steps outlined above may be varied, depending upon the desired result. For example, the coextruded sheet of layered ionomer and tie-layer may be directly thermoformed without cooling, thus skipping a cooling step. Other parameters may be varied as well in order to achieve a finished composite article having desirable features.

In another embodiment, the invention is a composite article including at least one layer of ionomer material, a tie-layer securable to a substrate material, and a substrate material secured to the tie-layer, the tie layer comprising at least one backing layer secured to the substrate, and wherein the backing layer comprises a blend of a tie-layer material and a substrate material. The at least one ionomer layer may further include both a surface layer and a sub-surface layer that is secured to the tie-layer. The surface ionomer layer is desirably clear or non-pigmented and have a thickness of from 75 to 150 μm, alternatively at least 100 μm. The substrate material may have a 1% secant flexural modulus of greater than 100 MPa.

Industrial Applications

The laminates and composite articles of the present invention can be used in various applications. They may be used in interior and exterior components of appliances such as clothing or dish washer exteriors, refrigerator door exteriors, refrigerator door interiors, refrigerator liners, refrigerator housings.

The laminates and composite articles of the present invention can also be applied in construction. Some examples include tubs and showers, liners for tubs and showers, counter tops, floor coatings, laminated surface counter tops, polymer/wood composites, prefabricated building materials, sidings, sinks and sink liners, synthetic marble panels, translucent glass replacements, vinyl tiles, wall covering, and wood replacements for decks.

Additionally, the laminates and composite articles of the present invention have utility in electronics for CDs and DVDs as well as for housing on TVs, VCRs, computers, and stereos.

The laminates and composite articles of the present invention may also be used in a variety of sporting equipment and parts. Illustrative examples include boats, hulls, boat hulls, marine boat hulls/canoe interiors and exteriors, boat covers, boat sails, jet skis (housings), skis, snowboards, snowmobiles, sports helmets, stadium seats, surfboards, helmets, and tent materials.

In other applications, the present invention is applied to exterior or interior automotive parts. Illustrative examples include vehicular parts, automotive parts, airbag doors, doors, automotive door panels (interior and exterior), body chassis, body panels, bumpers, deck lids, fenders, hoods, rocker panels, mirror housings, dashboards, instrument panels, fuel tanks, grills, hopper cars, interior trims, pillar trims, cup holders, personal containers, and wheel covers. Applications within this category also include other minor components of any 2, 3, 4 or more wheeled vehicles including farm tractors; lawn and garden tractors; lawn mowers; large trucks; bicycles; toy wagons; parts for All Terrain Vehicles (ATVs); parts for motorcycles such as fuel tanks; scooters; seat covers; helmets, and trims. They may also be used as protective and anti-icing surfacing for airplanes, helicopters, rockets, and shuttles.

The inventive laminates and composite articles may be used in lawn, yard, and garden applications as well. Some examples are lawn/outdoor furniture, pool liners and covers, outdoor ornaments, and bird houses.

The inventive laminates and composite articles may also be used in cable jacketing, children's toys, clothing/fabric (combined with non-wovens), Gamma-radiation resistant applications, GORETEX™, luggage, and other applications for coating plastics and metals where a dull or glossy and a scratch resistant surface is desirable such as plastic microwaveable cookware, plastic paper goods, reflective signage and other reflective articles on roads and clothing, and wheels on in-line skates.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

Terms that are or may be trademarked in some jurisdictions are used in the description. These terms are written in all capital letters, and is understood to recognize such trademarks. For brevity, markings such as "™" or "®" have not been used.

All priority documents are herein fully incorporated by reference for all jurisdictions in which such incorporation is permitted. Further, all documents cited herein, including testing procedures, publications, patents, journal articles, etc., are herein fully incorporated by reference for all jurisdictions in which such incorporation is permitted.

The aforementioned industrial applications may be combined with any of the embodiments described in the SUMMARY as well as any embodiments as claimed.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

Terms that are or may be trademarked in some jurisdictions are used in the description. These terms are written in all capital letters, and is understood to recognize such trademarks. For brevity, markings such as "™" or "®" have not been used.

All priority documents are herein fully incorporated by reference for all jurisdictions in which such incorporation is permitted. Further, all documents cited herein, including testing procedures, publications, patents, journal articles, etc., are herein fully incorporated by reference for all jurisdictions in which such incorporation is permitted.

What is claimed is:

1. A laminate consisting essentially of:
   a surface ionomer layer;
   a backing layer comprising acrylonitrile-ethylene-styrene; acrylonitrile-styrene acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crossliniked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and
   a tie-layer disposed between the ionomer layer and the backing layer;
   and wherein the thickness of the laminate is from 200 µm to 6 mm.

2. The laminate of claim 1, wherein the ionomer layer comprises a first ionomer layer and a second ionomer layer.

3. The laminate of claim 2, wherein one or both of the first ionomer layer and the second ionomer layer is pigmented, natural, or clear.

4. The laminate of claim 1, wherein the backing layer further comprises glass fibers, carbon fibers, polyaramide fibers, mineral fibers, mica, talc, metal whiskers, or mixtures thereof.

5. The laminate of claim 1, wherein the backing layer is multilayered.

6. The laminate of claim 1, wherein the backing layer is a blend.

7. A composite consisting essentially of:
   a surface ionomer layer;
   a tie-layer; and
   a substrate comprising acrylonitrile-ethylene-styrene; acrylonitrile-styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crossliniked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and
   wherein the tie-layer is disposed between the ionomer layer and the substrate;
   and wherein the thickness of the composite is from 200 µm to 6 mm.

8. The composite of claim 7, wherein the ionomer layer comprises a first ionomer layer and a second ionomer layer.

9. The composite of claim 8, wherein one or both of the first ionomer layer and the second ionomer layer is pigmented, natural, or clear.

10. The composite of claim 7, wherein the composite further comprises a backing layer.

11. The composite of claim 10, wherein the backing layer further comprises glass fibers, carbon fibers, polyaramide fibers, mineral fibers, mica, talc, metal whiskers, or mixtures thereof.

12. The composite of claim 10, wherein the backing layer is a blend.

13. The composite of claim 10, wherein the backing layer is multilayered.

14. The composite of claim 7, wherein the ionomer layer comprises a zinc-neutralized ionomer, a sodium-neutralized ionomer, or a mixture thereof.

15. The composite of claim 7, wherein the substrate further comprises glass fibers, carbon fibers, polyaramide fibers, mineral fibers, mica, talc, metal whiskers, or mixtures thereof.

16. The composite of claim 7, wherein the substrate is a foamed substrate.

17. A composite article consisting essentially of, in order:
   a surface ionomer layer;
   a tie-layer;
   a backing layer; and
   a substrate;

wherein at least one of the backing layer and substrate is selected from the group consisting of acrylonitrile-ethylene-styrene; acrylonitrile-styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crosslinked, glass-reinforced, polyester/polystyrene composition; a bulk molding compound; a crosslinked polyurethane; a reinforced polyurethane; crossliniked dicyclopentadiene; a silicone rubber; a styrene block copolymer; a compression-molded article of woven, glass-fiber-reinforced polypropylene fibers; blends thereof; and filled blends thereof; and wherein the thickness of the composite is from 200 µm to 6 mm.

18. The composite article of claim 17, wherein the filled blend comprises glass fibers, carbon fibers, polyaramide fibers, mineral fibers, mica, talc, metal whiskers, or mixtures thereof.

19. The composite article of claim 17, wherein the ionomer layer comprises a first ionomer layer and a second ionomer layer.

20. The composite article of claim 19, wherein one or both of the first ionomer layer and the second ionomer layer is pigmented, natural, or clear.

21. The composite article of claim 17, wherein the backing layer comprises glass fibers, carbon fibers, polyaramide fibers, mineral fibers, mica, talc, metal whiskers, or mixtures thereof.

22. The composite article of claim 17, wherein the backing layer is a blend.

23. The composite article of claim 17, wherein the backing layer is multilayered.

24. The composite article of claim 17, wherein the ionomer layer comprises a zinc-neutralized ionomer, a sodium-neutralized ionomer, or a mixture thereof.

25. The composite article of claim 17, wherein the thickness of the composite article is from 200 µm to 6 mm.

26. The composite article of claim 7, wherein the substrate is a foamed substrate.

27. A method of forming a composite article having a surface ionomer layer consisting essentially of:
providing a laminate having a surface ionomer layer; and securing a substrate to the laminate;
wherein the substrate comprises acrylonitrile-ethylene-styrene; acrylonitrile-styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crosslinked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof;
and wherein the thickness of the composite is from 200 82 m to 6 mm.

28. The method of claim 27, wherein the substrate further comprises glass fibers, carbon fibers, polyaramide fibers, mineral fibers, mica, talc, metal whiskers, or mixtures thereof.

29. The method of claim 27, wherein the laminate comprises an ionomer layer comprising a first ionomer layer and a second ionomer layer.

30. The method of claim 29, wherein one or both of the first ionomer layer and the second ionomer layer is pigmented, natural, or clear.

31. The method of claim 29, wherein the ionomer layer comprises a zinc-neutralized ionomer, a sodium-neutralized ionomer, or a mixture thereof.

32. The method of claim 27, wherein the composite article comprises a backing layer.

33. The method of claim 32, wherein the backing layer is multilayered.

34. The method of claim 32, wherein the backing layer is a blend.

35. The method of claim 27, wherein the thickness of the composite article is from 200 µm to 6 mm.

36. The method of claim 27, wherein the substrate is a foamed substrate.

37. The method of claim 27, wherein the laminate is a shaped laminate.

38. A composite article having a surface ionomer layer formed by the method consisting essentially of:
coextruding an ionomer layer and a tie-layer to form a laminate;
forming a shape from the laminate, resulting in a shaped laminate; and
securing a substrate material to the shaped laminate;
wherein the substrate comprises acrylonitrile-ethylene-styrene; acrylonitrile-styrene acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyamide elastomer; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crosslinked, glass-reinforced, polyester/polystyrene composition; a bulk molding compound; a crossliniked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and wherein the thickness of the composite is from 200 µm to 6 mm.

39. The composite article of claim 38, wherein the step of forming comprises thermoforming.

40. The composite article of claim 38, wherein the ionomer layer comprises a first ionomer layer and a second ionomer layer.

41. The composite article of claim 40, wherein one or both of the first ionomer layer and the second ionomer layer is pigmented, natural, or clear.

42. The composite article of claim 38, wherein the laminate further comprises a backing layer.

43. The composite article of claim 42, wherein the backing layer is a blend.

44. The composite article of claim 42, wherein the backing layer is multilayered.

45. The composite article of claim 38, wherein the ionomer layer comprises a zinc-neutralized ionomer, a sodium-neutralized ionomer, or a mixture thereof.

46. The composite article of claim 38, wherein the thickness of the composite article is from 200 μm to 6 mm.

47. The composite article of claim 38, wherein the substrate further comprises glass fibers, carbon fibers, polyaramide fibers, mineral fibers, mica, talc, metal whiskers, or mixtures thereof.

48. The composite article of claim 38, wherein the substrate is a foamed substrate.

49. A vehicle comprising a composite consisting essentially of:
   a surface ionomer layer;
   a tie-layer; and
   a substrate comprising acrylonitrile-ethylene-styrene; acrylonitrile styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crossliniked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and
   wherein the tie-layer is disposed between the ionomer layer and the substrate;
   and wherein the thickness of the composite is from 200 μm to 6 mm.

50. An appliance comprising a composite consisting essentially of:
   a surface ionomer layer;
   a tie-layer; and
   a substrate comprising acrylonitrile-ethylene-styrene; acrylonitrile-styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crossliniked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and
   wherein the tie-layer is disposed between the ionomer layer and the substrate;
   and wherein the thickness of the composite is from 200 μm to 6 mm.

51. An automotive part comprising a composite comprising:
   a surface ionomer layer;
   a tie-layer; and
   a substrate comprising acrylonitrile-ethylene-styrene; acrylonitrile-styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crossliniked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and
   wherein the tie-layer is disposed between the ionomer layer and the substrate;
   and wherein the thickness of the composite is from 200 μm to 6 mm.

52. A boat hull comprising a composite comprising:
   a surface ionomer layer;
   a tie-layer; and
   a substrate comprising acrylonitrile-ethylene-styrene; acrylonitrile-styrene-acrylate; butyl rubber; halogenated butyl rubber; a copolymer of isobutylene and an alkylstyrene; polyisobutylene; a chlorosulfonated polyethylene rubber; a copolyester; a cyclic olefin copolymer; a dynamically vulcanized alloy; a liquid crystal polymer; natural rubber; a general purpose rubber; nitrile rubber; polyacrylonitrile; a polyarylate; a polyaryletherketone; polybenzimidazole; polybutylene terephthalate; polybutylene naphthalate; a polyester elastomer; polyethylene naphthalate; polyetherketone; polyethersulfone; polyimidesulfone; polymethacrylate-acrylonitrile-butadiene-styrene; polyphenylsulfone; polymethylmethacrylate; a high impact polystyrene; syndiotactic polystyrene; polystyrene maleic anhydride; a crossliniked, glass-reinforced, polyester/polystyrene composition; a bulk molding compound; a crosslinked polyurethane; a reinforced polyurethane; crosslinked dicyclopentadiene; a silicone rubber; a styrene block copolymer; a compression-molded article of woven, glass-fiber-reinforced polypropylene fibers; or mixtures thereof; and wherein the tie-layer is disposed between the ionomer layer and the substrate;

and wherein the thickness of the composite is from 200 μm to 6 mm.

* * * * *